UNITED STATES PATENT OFFICE.

CHARLES THOMAS, WILLIAM J. FULLER, AND SYDNEY A. KING, OF BRISTOL, ENGLAND.

RECOVERY OF GLYCERINE FROM SOAP-LYES.

SPECIFICATION forming part of Letters Patent No. 252,155, dated January 10, 1882.

Application filed November 4, 1879. Patented in England March 31, 1879.

*To all whom it may concern:*

Be it known that we, CHARLES THOMAS, of the city of Bristol, England, soap manufacturer, WILLIAM JAMES FULLER, of the same place, analytical chemist, and SYDNEY ABRAHAM KING, also of the same place, manager, have invented certain Improvements in the Recovery of Glycerine from Soap-Lyes, of which the following is a specification.

The object of this invention is to recover the glycerine which is contained in the ordinary spent, or partially spent, lyes produced in the manufacture of soap.

Great difficulties have hitherto been experienced in dealing with this residuum, owing to the carbonate of soda, common salt, and other impurities contained therein, which presented an obstacle to the recovery of the glycerine.

In carrying out our invention we evaporate the spent, or partially spent, lyes until the boiling-point of the liquid rapidly rises, when nearly all the salts that can be thrown down by simple evaporation are deposited in the pan. The resulting liquor is chiefly composed of raw or impure glycerine. This liquor we draw off into a second vessel or pan and boil it with an excess of fatty acid, which readily combining with some of the salts in solution separates them from the liquor and at the same time removes from it the fine crystals of salt which are formed during this operation. After this treatment we skim off the saponified fatty matter, allow the liquid to cool, and filter it to remove the gelatinous, albuminous, and other impurities. The clear liquid may then be refined, distilled, or concentrated, as desired.

Having now set forth the nature of our invention of improvements in the recovery of glycerine from soap-lyes, and explained the manner of carrying the same into effect, we wish it to be understood that we claim—

The process above described for recovering glycerine from soap-lyes, which consists in throwing down from the lyes by applying heat thereto the greater proportion of the salts suspended therein, then boiling the liquor with an excess of fatty acid to effect the combination with the acid of the remaining salts, and, lastly, filtering the glycerine-liquor to remove therefrom the gelatinous and other impurities, all substantially as specified.

Dated the 10th day of October, 1879.

CHARLES THOMAS.
WM. J. FULLER.
SYDNEY A. KING.

Witnesses:
  ALFRED BRITTAN,
  GEO. BRITTAN,
    *Solrs., Bristol.*